United States Patent
Gaumann

(10) Patent No.: US 8,820,563 B2
(45) Date of Patent: Sep. 2, 2014

(54) COOKING LID

(75) Inventor: Joern Gaumann, Dortmund (DE)

(73) Assignee: GMS GmbH, Dortmund (DE)

(*) Notice: Subject to any disclaimer, the term of this patent is extended or adjusted under 35 U.S.C. 154(b) by 0 days.

(21) Appl. No.: 13/282,719

(22) Filed: Oct. 27, 2011

(65) Prior Publication Data

US 2013/0105484 A1     May 2, 2013

(51) Int. Cl.
*B65D 51/18* (2006.01)
*B65D 51/16* (2006.01)
*A47J 27/58* (2006.01)

(52) U.S. Cl.
CPC ..................................... *B65D 51/16* (2013.01)
USPC .................. 220/254.8; 220/253; 220/203.06; 220/369; 126/384.1

(58) Field of Classification Search
USPC ........... 220/254.8, 369, 367.1, 573.1, 203.05, 220/203.06, 203.16, 203.15, 253; 126/384.1
See application file for complete search history.

(56) References Cited

U.S. PATENT DOCUMENTS

| | | | |
|---|---|---|---|
| 534,138 A * | 2/1895 | Cleary | 99/347 |
| 546,526 A * | 9/1895 | Greene | 222/183 |
| 1,193,954 A * | 8/1916 | Walden | 366/343 |
| 1,941,048 A * | 12/1933 | Punte | 220/203.15 |
| 2,506,957 A * | 5/1950 | Gomez | 220/231 |
| 2,751,901 A * | 6/1956 | Livermore | 126/384.1 |
| 3,055,536 A * | 9/1962 | Dieny | 220/203.11 |
| 3,486,665 A * | 12/1969 | LaCroce | 222/480 |
| 4,091,956 A * | 5/1978 | Vecchio | 220/231 |
| 4,298,131 A * | 11/1981 | Saito et al. | 220/231 |
| 4,828,140 A * | 5/1989 | Henderson | 220/369 |
| 5,105,810 A * | 4/1992 | Collins et al. | 607/9 |
| 5,105,811 A * | 4/1992 | Kuzma | 607/57 |
| 5,564,480 A * | 10/1996 | Chen | 141/65 |
| 5,750,967 A * | 5/1998 | Sprauer, Jr. | 219/735 |
| 7,090,090 B2 * | 8/2006 | Ohyama | 220/367.1 |
| 8,020,723 B2 * | 9/2011 | Auer et al. | 220/780 |
| 2004/0079755 A1* | 4/2004 | Graus | 220/253 |
| 2004/0188442 A1* | 9/2004 | Ohyama | 220/367.1 |

* cited by examiner

*Primary Examiner* — Mickey Yu
*Assistant Examiner* — Niki Eloshway
(74) *Attorney, Agent, or Firm* — Collard & Roe, P.C.

(57) ABSTRACT

The invention relates to a cooking lid (1) for preventing liquids from boiling over, having at least one passage opening (4) to which a movable closure part (3) of a closure element (2) is assigned. In order to make available a cooking lid (1) that guarantees not only a controlled cooking process but also sufficient escape of steam, and also offers a possibility of adding ingredients or liquids during the cooking process, the invention provides that the closure part (3) is disposed so as to rotate.

4 Claims, 7 Drawing Sheets

COOKING LID

Figure 1:
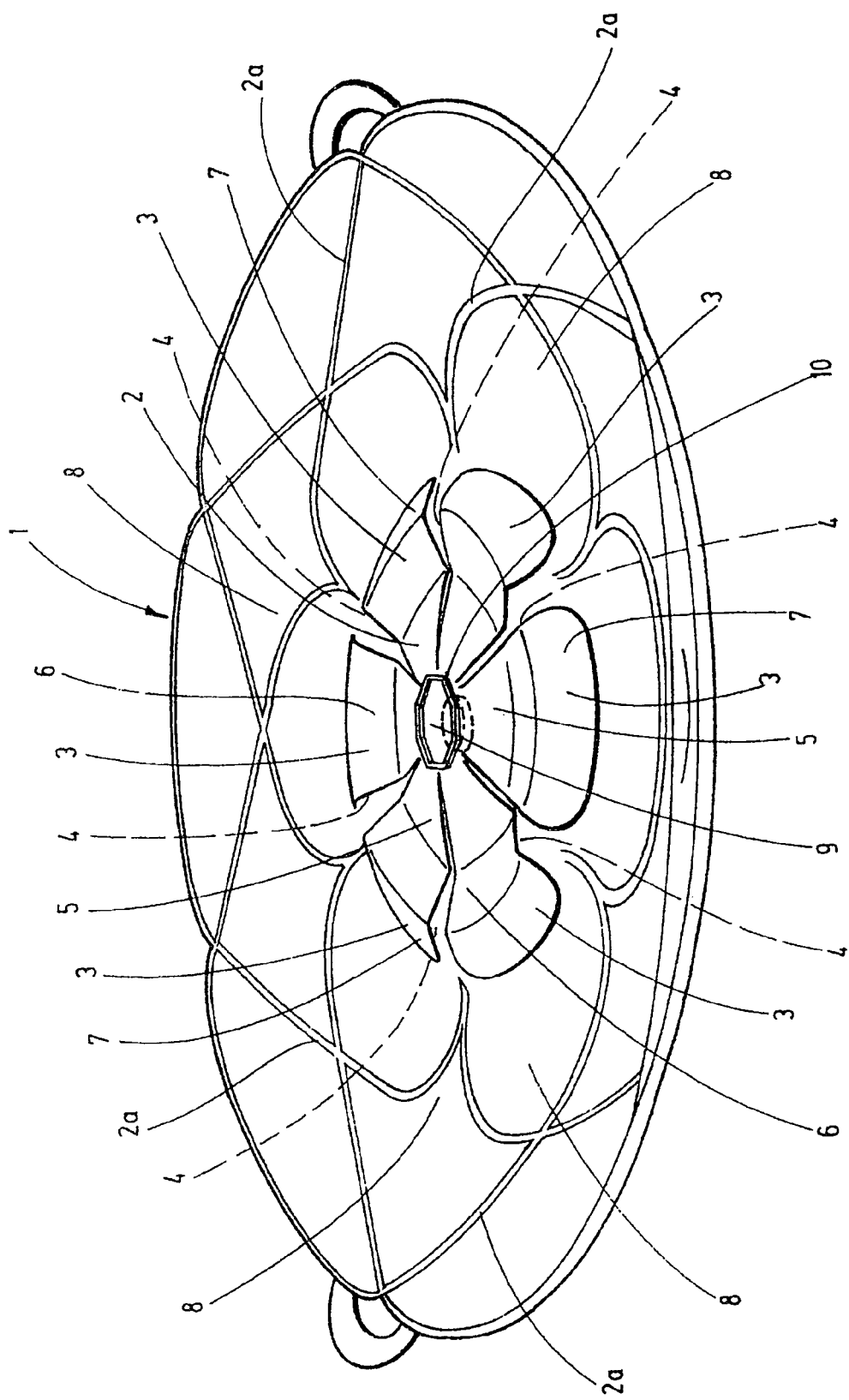

The invention relates to a cooking lid for preventing liquids from boiling over, having at least one passage opening to which a movable closure part of a closure element is assigned.

Cooking lids of the type stated initially are known and familiar to a person skilled in the art, and fulfill the function of preventing liquids that are boiling up or foaming up from exiting.

For this purpose, in the case of a previously known cooking lid, a movable closure part is provided, which is assigned to a passage opening and covers it. The closure part is moved into an open position, in which the passage opening is exposed, at least in part, by means of contact with a liquid that is boiling up or foaming up.

During the cooking process, the passage opening is closed, in the case of the previously known cooking lid, while the liquid moves the closure part into the open position when it boils up or foams up, i.e. when the liquid that is boiling up or foaming up comes into contact with the closure part. The open position is characterized, among other things, by means of the opening width, i.e. the distance between opening and closure part. The opening width varies and is dependent on the force acting on the closure part, i.e. on the intensity of the boiling or foaming process.

In the case of the cooking lids known from the state of the art, the liquid passes through the passage opening and collects on the bowl-shaped cooking lid, so that finally, cooling and an accompanying return flow of the liquid through the open passage opening take place.

However, it has proven to be a disadvantage of the use of a cooking lid of the type stated initially that the cooking process itself cannot be observed directly, and that the escape of steam that is necessary for the cooking process of certain foods is not guaranteed, because the closure part covers or closes off the passage opening. This also leads to the further disadvantage that no ingredients or liquids can be added during the cooking process.

It is therefore the task of the present invention to make available a cooking lid of the type stated initially, which guarantees not only a controlled cooking process but also sufficient escape of steam, and also the possibility of adding ingredients or liquids even during the cooking process.

This task is accomplished with the characteristics of claim 1. Advantageous embodiments of the invention are evident from the dependent claims.

The invention provides that the closure part is disposed so that it can rotate. In this way, it is guaranteed that the user of the cooking lid can expose the passage opening, in whole or in part, if necessary. Thus, it is advantageously guaranteed for the cooking lid according to the invention that steam can be allowed to escape, the cooking process can be checked, or ingredients can be added during the cooking process.

For the rotary mechanism, it is advantageous that the lid has an axis of rotation centrally, which carries the closure part. Preferably, the lid has a round or polygonal passage opening in the center for this purpose.

An advantageous embodiment of the invention provides that the lid is configured in bowl shape. In this way, it is guaranteed that the liquid that boils up or foams up collects within the lid, and cannot run over at the edges of the cooking lid.

A practical variant of the invention provides that the cooking lid is formed from an elastic material. Because the cooking lid is formed from an elastic material, the cooking lid can adapt more easily and flexibly to construction shapes of cooking containers, in advantageous manner. Cooking containers have different diameters. By means of the cooking lid, formed from an elastic material, it is guaranteed that the edges of cooking containers that enter into contact with the cooking lid are sealed off, independent of the diameter of the cooking container, because the cooking lid that is made from an elastic material adapts better to the cooking container opening. In this way, in turn, it is guaranteed that an exit of liquid or foam at the edges of the cooking container is prevented.

Another advantageous embodiment of the invention provides that the closure part is formed, at least in part, from an elastic material. The closure part made from an elastic material offers the advantage that the closure part is easily movable and has a low opening resistance, so that even liquids that are foaming or boiling slightly can get through the passage openings.

Preferably, the closure part overlaps or covers the assigned passage opening. In this way, it is particularly ensured that heat energy remains within the cooking container.

In order to increase the rigidity of the cooking lid, another practical variant of the invention provides that the reinforcements on the top of the cooking lid are formed from glass, metal and/or another stronger material.

Figure 2:
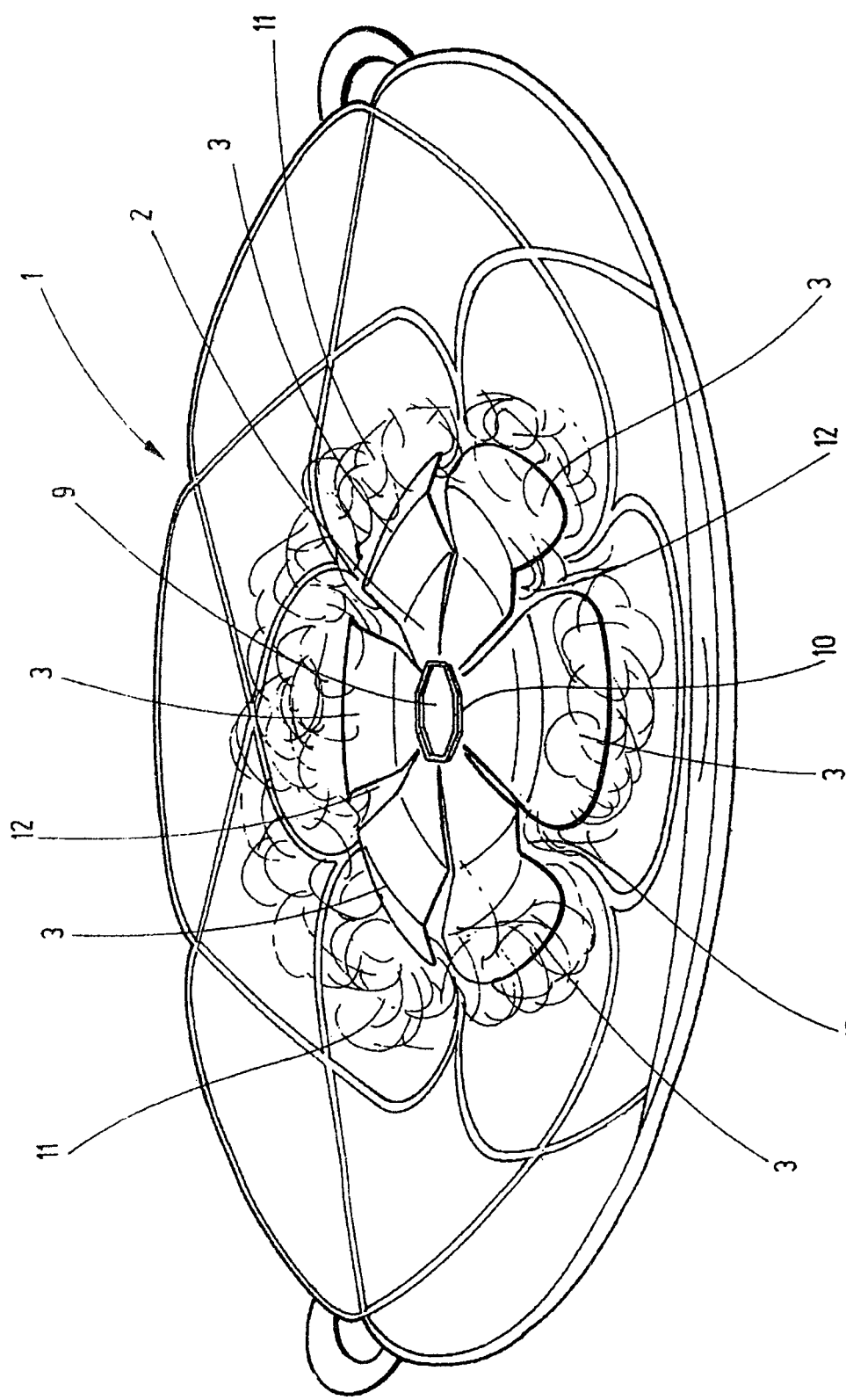
Figure 3:
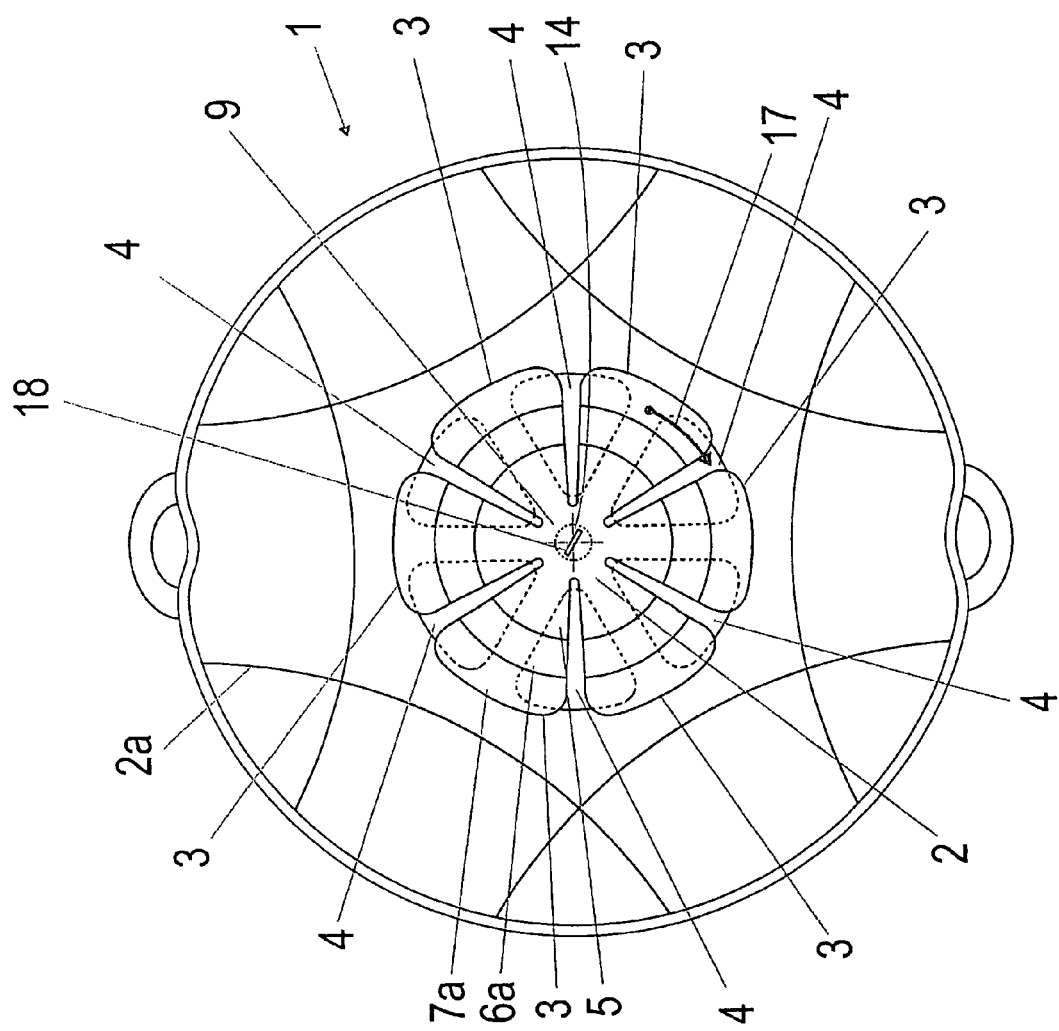
Figure 4:
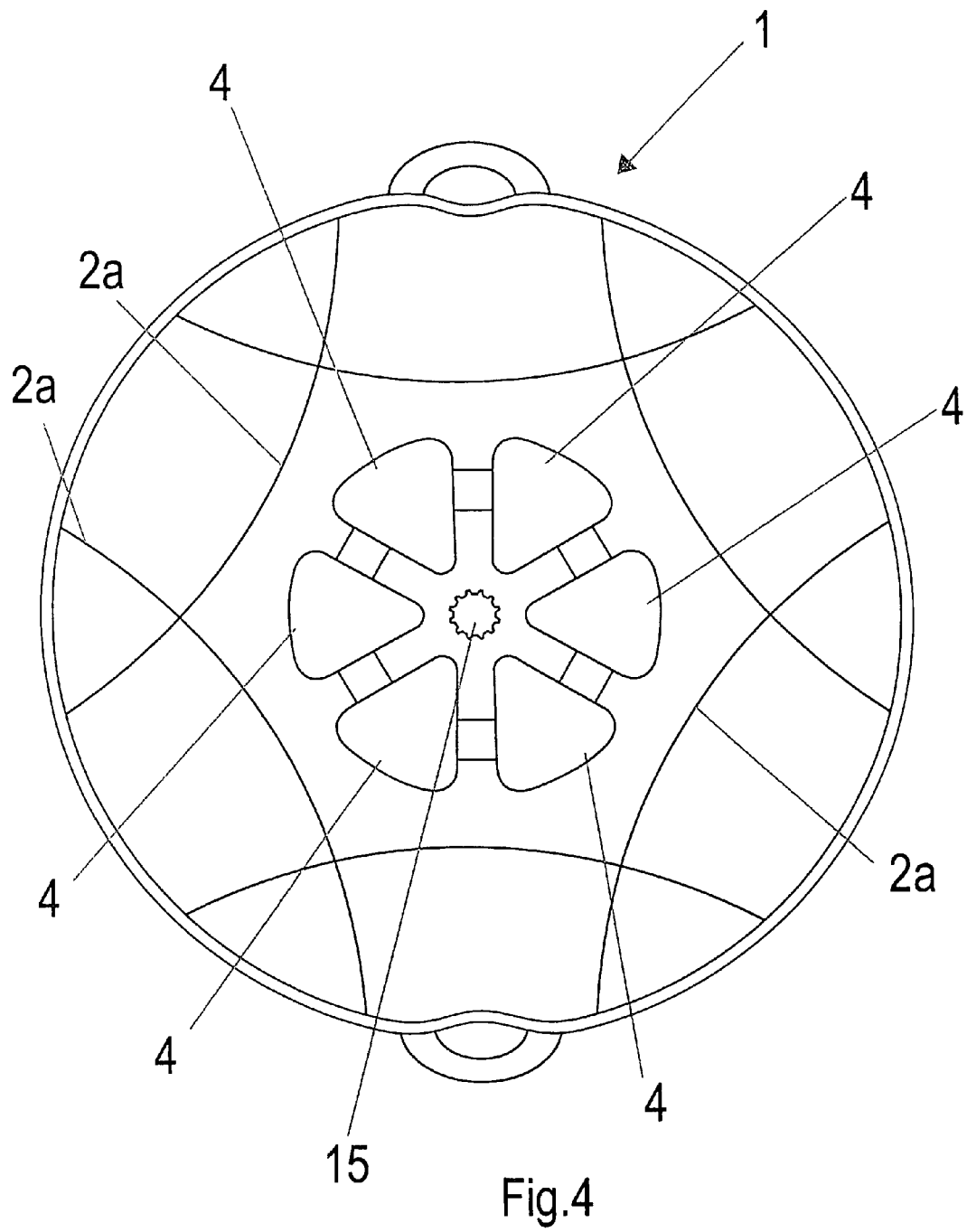
Figure 5:
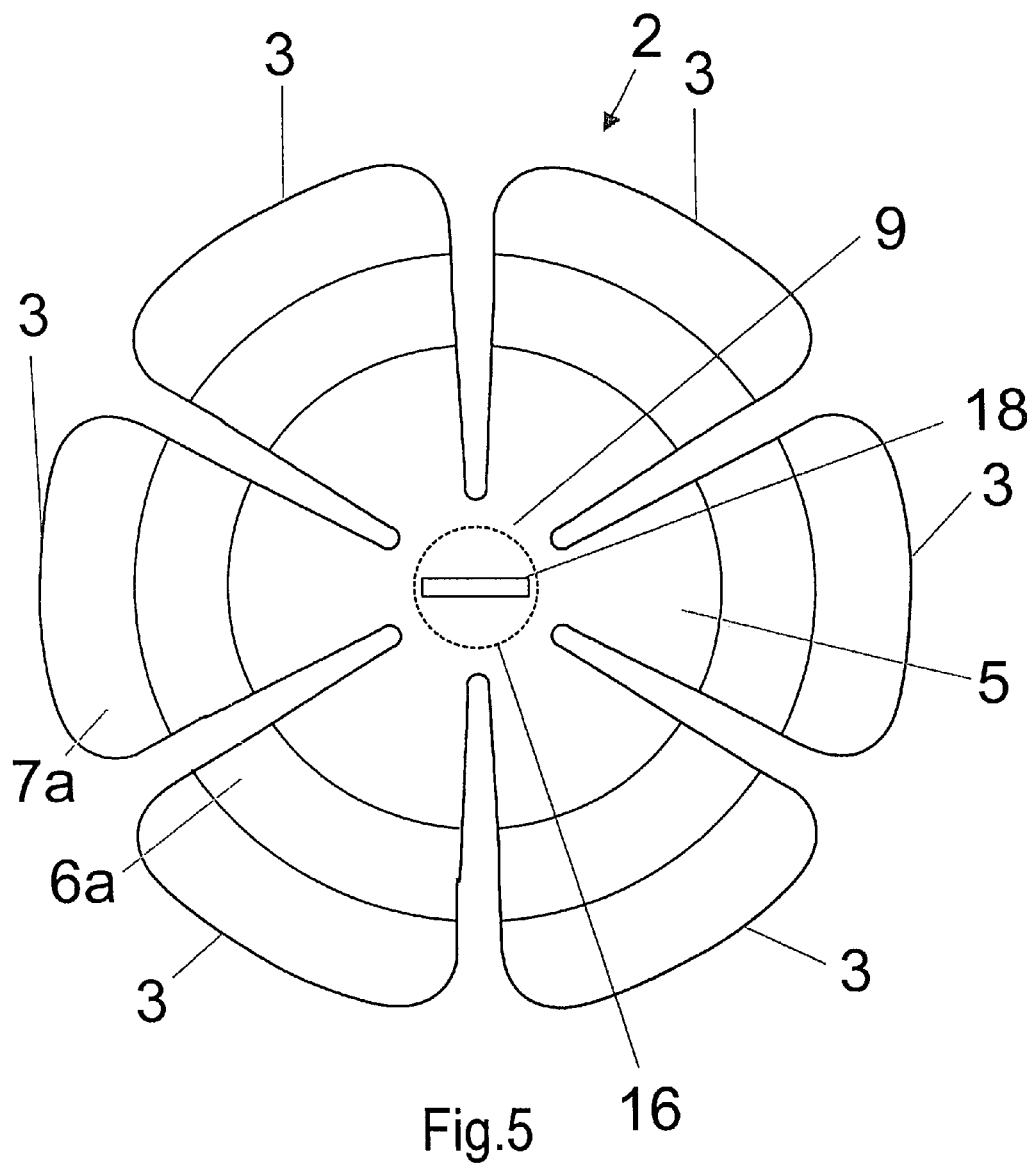
Figure 6:
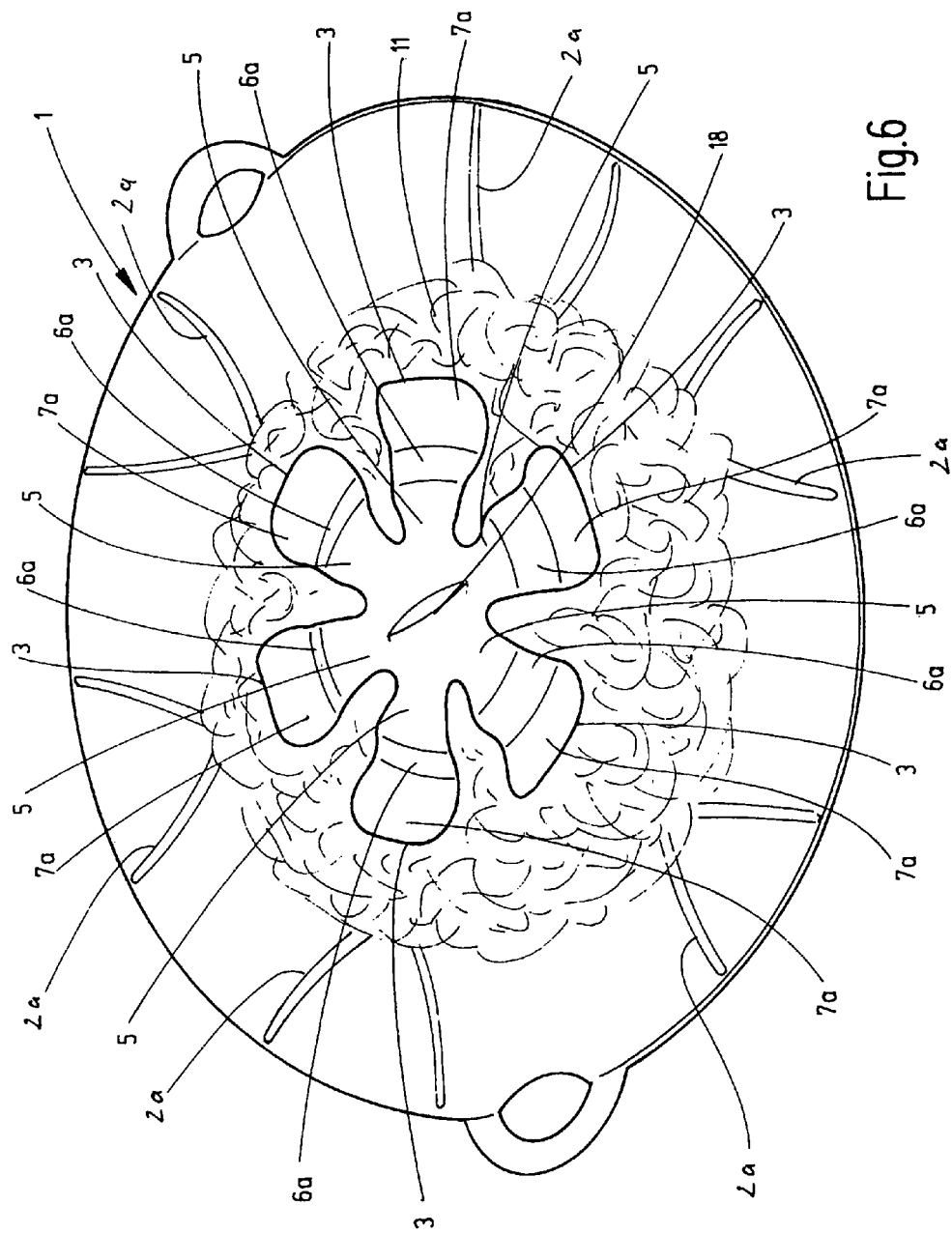
Figure 7:
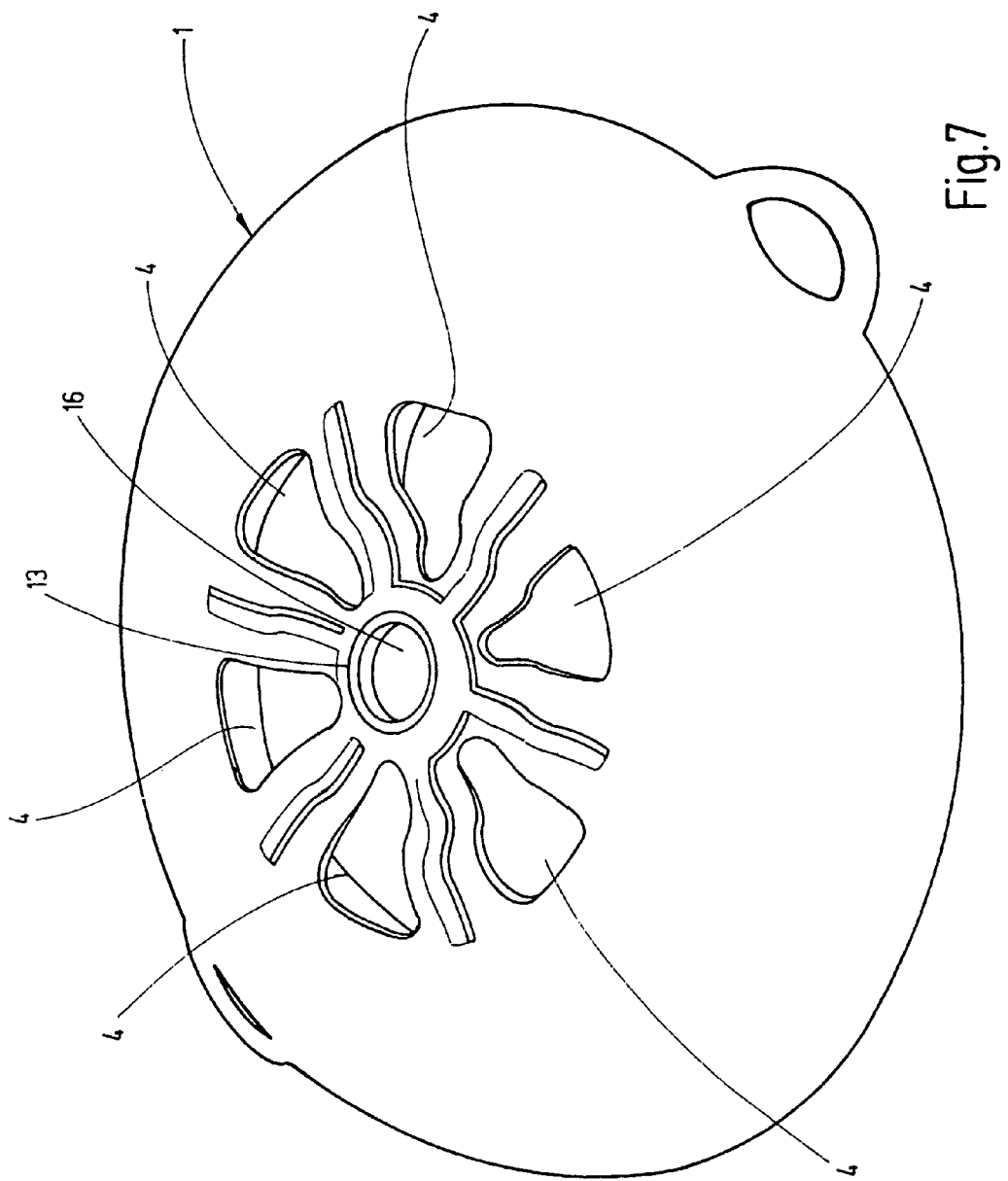

In the following, the invention will be explained in greater detail using the drawings. These show, in a schematic representation:

FIG. 1 a perspective view of a cooking lid according to the state of the art,

FIG. 2 a perspective view of a cooking lid according to the state of the art, through the passage openings of which liquid that is foaming up has passed, FIG. 3 in a top view, the cooking lid according to the invention, in which the closure part has been rotated, FIG. 4 in a top view, the cooking lid according to the invention without the closure part, FIG. 5 the rotating closure part assigned to the cooking lid according to the invention, FIG. 6 a perspective view of the cooking lid according to the invention, and FIG. 7 a rear view of the cooking lid according to the invention.

FIG. 1 shows a conventional cooking lid 1 known from the state of the art, which is formed from an elastic material, preferably from silicone, and is provided with reinforcements 2a.

The bowl-shaped cooking lid 1 has a closure element 2, configured in one piece, in the center, onto which element six closure parts 3 that extend outward are formed. The passage openings 4 shown in FIG. 3 are situated below the closure parts 3; like the closure parts 3, they are disposed with uniform distribution. Each of the passage openings 4 has a closure part 3 that corresponds to the passage opening 4 assigned to it. The closure parts 3 have such a structure that they have an essentially horizontal region 5, which makes a transition into a region 6 that faces upward, at a slant. This region 6 is followed by a region 7 that faces downward and makes a transition into the outer region 8 of the bowl-shaped cooking lid 1.

On the side facing away from the outer region 8, the closure parts 3 end in a disk-shaped central region 9 of the closure element 2, which region is provided with a projection 10. On the underside of the central region 9, i.e. on the side of the central region 9 of the one-piece closure element 2 that faces away from the projection 10, a rectangular projection not shown in FIG. 1 is formed, which is inserted with precise fit into a corresponding rectangular opening of the cooking lid 1, not shown in FIG. 1.

By means of these technical measures, it is guaranteed that the closure element 2 sits on the cooking lid 1 firmly and immovably.

As is evident from FIG. 2, the closure parts 3 are moved upward when a foaming liquid 11 impacts them, so that an opening width 12 is formed between the passage openings 4 and the closure parts 3, and the liquid 11 that is foaming up can enter into the bowl-shaped cooking lid 1.

In a manner essential to the invention, as FIGS. 3 and 6 show, the cooking lid 1, which has a round shape, is provided with a rotary mechanism for the closure element 3. The direction of rotation is indicated with the arrow 17. For this purpose, the cooking lid 1 has an axis of rotation 14 in the center, which carries the closure parts 3, so that the closure parts 3 are disposed so as to rotate. The axis of rotation 14 runs centrally through the central region 9, and is disposed perpendicular to it. Because the closure parts 3 are disposed so as to rotate, the passage openings 4 can be exposed, in whole or in part. The passage openings 4 have a triangular footprint with arc-shaped corners in the embodiments of the cooking lid 1 shown in FIGS. 3 and 4, corresponding to the closure elements 3. The closure parts 3 are formed in such a manner, as is also evident from FIG. 6, that they have an essentially horizontal region 5 that makes a transition into a region 6a that faces downward, at a slant. This region 6a is followed by a region 7a that faces upward, which makes a transition into an outer region 8 of the bowl-shaped cooking lid 1. This method of construction of the closure parts 3, which deviates from the conventional cooking lid 1 as shown in FIG. 1, with its division into the regions 5, 6a, and 7a, as FIG. 3 shows, contributes to the ability to rotate the closure element 2. In order to facilitate grasping, picking up, or rotating the closure element 2, this element is provided with a handle-shaped projection 18 on the top, on the central region 9. The cooking lid 1, as FIG. 6 shows, is provided with arc-shaped reinforcements 2a that start and end at the edge of the cooking lid 1, in each instance, and intersect two reinforcements 2a, in each instance.

Contrary to a cooking lid according to the state of the art, the cooking lid 1, as is evident from FIG. 4, has a round or polygonal passage opening 15. The passage opening 15, contrary to the state of the art, no longer has a rectangular shape, so that a rotating component 16 of the closure element 2, as FIG. 5 shows, can be inserted with precise fit into the passage opening 15 shown in FIG. 4. The rotating component 16 is formed as a projection on the underside of the central region 9, on the closure element 2 that is configured in one piece, and has a round shape, for example, in the form of a cylinder.

The rotating component 16 has an edge 13 that faces outward and rests on the central region 9, as is evident from FIG. 7.

The present invention is not restricted, in its embodiment, to the exemplary embodiment indicated above. Instead, a number of variants is possible, which make use of the solution presented also in the case of embodiments having a different structure. For example, the closure parts 3 can also have the shape of circular disks.

REFERENCE SYMBOL LIST 1 cooking lid
2 closure element
2a reinforcements
3 closure parts
4 passage openings
5 horizontal region
6 region facing upward
6a region facing downward
7 region facing downward
7a region facing upward
8 outer region
9 central region
10 projection
11 liquid foaming up
12 opening width
13 edge
14 axis of rotation
15 passage opening
16 rotating component
17 arrow
18 handle-shaped projection

The invention claimed is:

1. A cooking lid for preventing liquids from boiling over, said lid comprising:
   a) a round or polygonal central passage opening disposed at a center of said lid;
   b) a plurality of passage openings uniformly distributed around said central passage opening; and
   c) a closure element comprising:
      i) a central region, wherein said closure element is disposed so as to rotate about an axis of rotation extending through the center of the lid and perpendicular to said central region of said closure element; and
      ii) a plurality of closure parts extending radially outwardly from said central region and uniformly distributed around said central region, each of said plurality of closure parts separated from each adjacent closure part by an associated gap of a plurality of gaps extending radially outwardly from said central region;
   wherein said closure element is movable between a first position wherein each of said plurality of closure parts is aligned with an associated passage opening of said plurality of passage openings and a second position wherein each of said plurality of closure parts is circumferentially offset from an associated passage opening of said plurality of passage openings and each of said plurality of gaps is aligned with an associated passage opening of said plurality of passage openings for exposing said passage openings;
   wherein said lid is configured in a bowl shape; and
   wherein said closure parts have a horizontal region that makes a transition into a region that faces downward, at a slant, which region is followed by a region that faces upward, which region makes a transition into an outer region of the bowl-shaped lid.

2. Lid according to claim 1, wherein a rotating component of the closure element, which carries the plurality of closure parts, is inserted into the round or polygonal central passage opening.

3. Lid according to claim 1, wherein said lid is formed, at least in part, from an elastic material.

4. Lid according to claim 1, wherein the closure part is formed, at least in part, from an elastic material.

* * * * *